Figure 5:
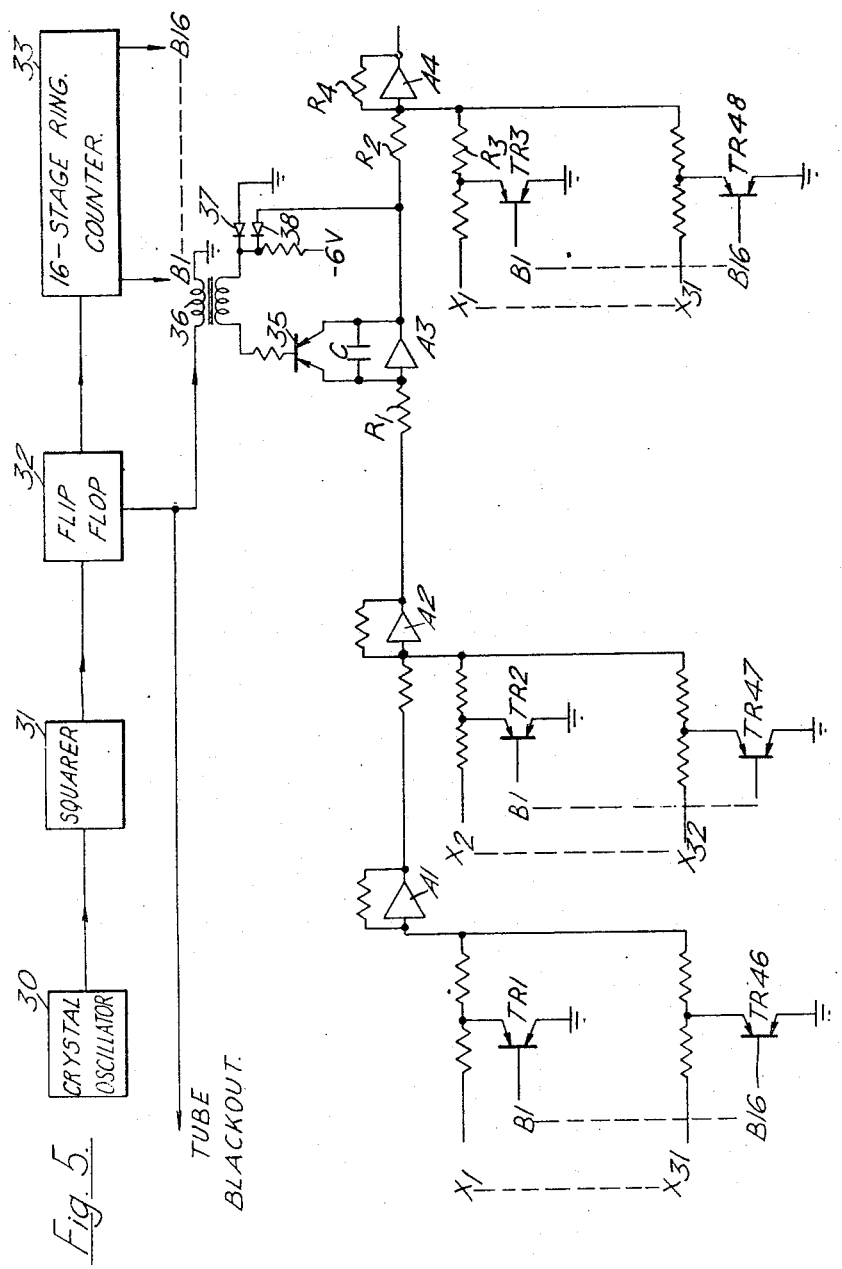

June 27, 1967  A. G. BARNES  3,327,407
FLIGHT SIMULATOR DISPLAY APPARATUS
Filed May 7, 1965  4 Sheets-Sheet 1
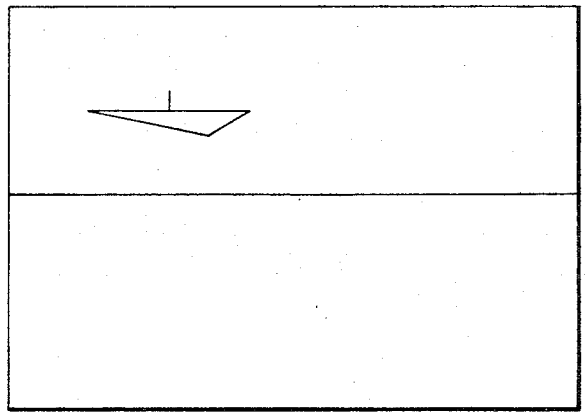
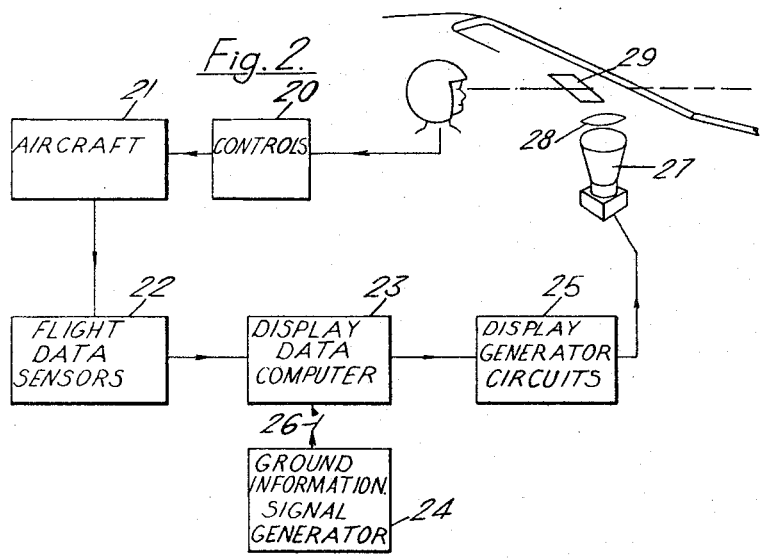
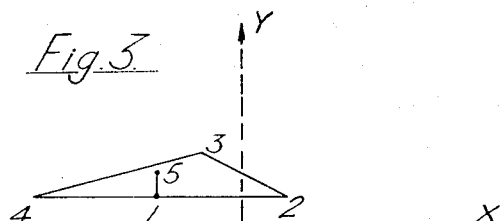
INVENTOR
ARTHUR GEORGE BARNES
BY
Bailey, Stephens v. Huettig
ATTORNEYS

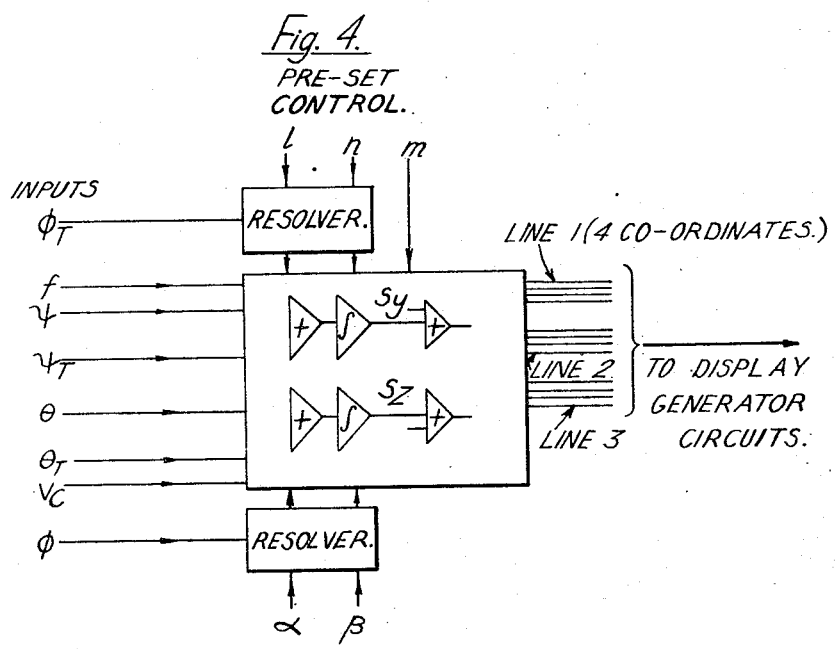
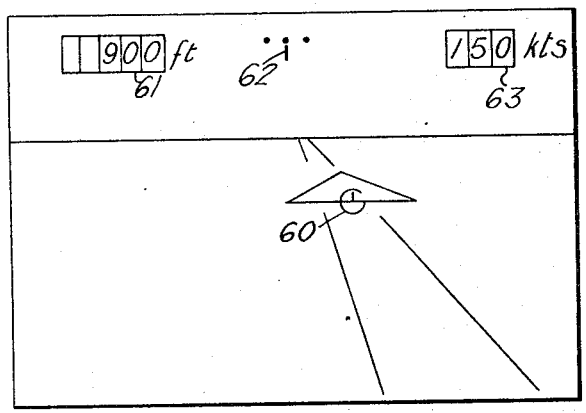

INVENTOR
ARTHUR GEORGE BARNES
ATTORNEYS

Fig. 6.
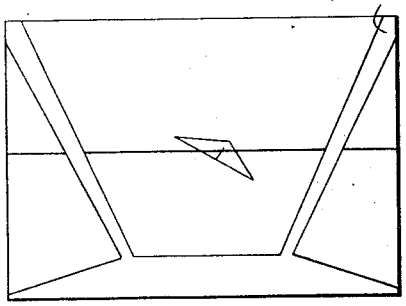
(a)
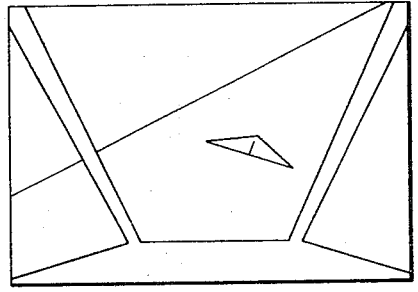
(b)
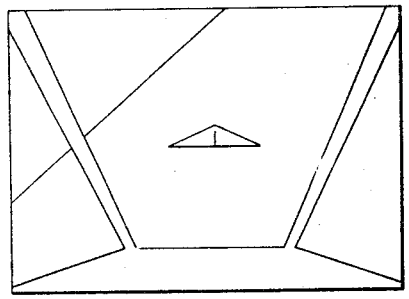
(c)
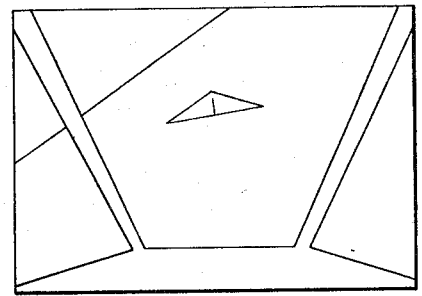
(d)
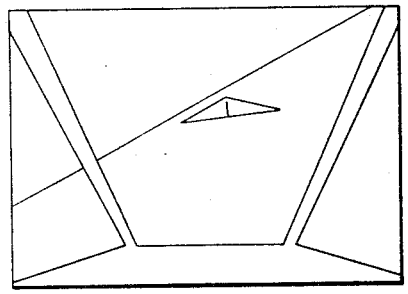
(e)
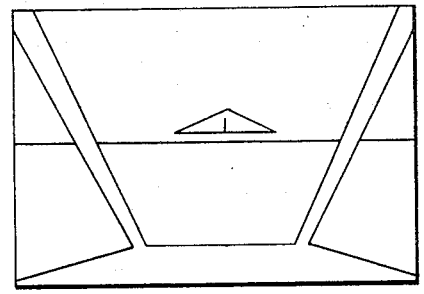
(f)

United States Patent Office 3,327,407
Patented June 27, 1967

3,327,407
FLIGHT SIMULATOR DISPLAY APPARATUS
Arthur G. Barnes, Lytham, England, assignor to British Aircraft Corporation (Operating) Limited, London, England, a British company
Filed May 7, 1965, Ser. No. 453,969
Claims priority, application Great Britain, May 15, 1964, 20,359/64
9 Claims. (Cl. 35—12)

This invention relates to simulated visual displays for use in a grounded flight simulator or in an airborne craft. It has been proposed, in order to alleviate the task of the pilot, to provide electronically a visual display representing on a screen objects external to the aircraft so that the pilot can judge the position of the aircraft relative to these external objects and can guide his aircraft accordingly.

According to the present invention, electronic trace generators are used to provide on a display screen a representation of a flying body, and means responsive to external input data representing the required movement of the craft and to the movement or simulated movement of the craft, relative to the external object or objects acts upon the trace generator in such a manner as to modify the apparent contours of the flying body when a corrective movement is required, or when there is a change in the direction or speed of movement (or simulated movement) of the craft. In this way, the appearance of the flying body display is modified in a manner similar to the variation of the perspective of an aircraft flying ahead of the pilot, when there is a relative movement between the leading aircraft and the one in which the pilot is located.

The electronic trace generator includes a number of deflection control circuits for deflecting the light spot over the display screen and these deflection control circuits may be controlled by input data in the form of co-ordinates of the ends of a required line.

The trace generators may also provide a horizon with a heading index centrally positioned on the horizon. As an example, the representation of the flying body may take the form of three lines forming a triangle, representing a delta-winged aircraft. A datum marker is provided centrally on the longest line of the triangle, which is in normal flight parallel to the horizon. It will be seen that the problem facing the pilot with a display of this kind when a corrective movement is required is the same as that in formation flying at short separation distances and similar to tail chasing at large separation distances. By feeding manoeuvres into the trace generators generating the "lead aircraft" (for example by causing the lead aircraft to turn onto a new heading or to climb) the pilot can be directed to perform predetermined manoeuvres.

The display can be in the form of a "head up" display, in which the image of the display is collimated to appear at infinity and is superimposed on the external visual field by a suitable optical system. This has the advantage that considerable reduction in transition time from instruments to visual flight is achieved.

In order that the invention may be better understood some typical displays and typical apparatus embodying the invention will now be described with reference to the accompanying drawings, in which:

FIGURE 1 illustrates a typical display;
FIGURE 2 is a block diagram of the apparatus controlling the form of the display;
FIGURE 3 is a diagram which is useful in understanding the manner in which the display co-ordinates are computed;
FIGURE 4 illustrates diagrammatically the display data computer;
FIGURE 5 shows a circuit for generating the trace deflection signals;
FIGURE 6 shows a typical display sequence; and
FIGURE 7 shows the display in the landing approach mode.

In the simple display illustrated in FIGURE 1, the "lead aircraft" is represented by three lines, which together form a triangle, and a vertical line at the mid-point of the line which represents the trailing edge of the aircraft. The display represents roughly a delta-winged aircraft. A single line representing a horizon is also provided in this example.

As shown in FIGURE 2, the pilot views the front of a cathode ray tube 27, on which the display is formed, through an optical collimating system 28 and a reflector glass 29.

The display may be modified by any alteration of the speed, direction or position of the craft which the pilot is flying (or of the simulated craft if the pilot is in a flight simulator) and also by any change of flight path which the aircraft is required to perform. The block diagram of the apparatus for generating and modifying the display is also shown in FIGURE 2. It will be assumed that the pilot is using his display and attempting to follow the "lead aircraft" represented in the display. To do this, he adjusts his flight controls 20, and in this way changes the direction of his own aircraft 21 as required to follow the "lead aircraft." These changes are sensed by the flight data sensors 22, which generate signals for application to a display data computer 23. The latter circuit also receives command information from the ground information signal generators 24, and combines the command information and the flight information to compute the position of the "lead aircraft." The display generators 25 then generate suitable deflection waveforms, on the basis of electrical signals representing the co-ordinates of the ends of each trace line. The deflection waveforms are applied to the cathode ray tube.

A switch 26 permits the ground information signal generator to be disconnected if modification of the display by the command data is not required.

The equations used to generate a "lead aircraft" will now be given with reference to FIGURE 3. These equations are such that the voltages produced by the computer based on these equations will obey the geometrical laws concerning the aspects of a delta-winged aircraft viewed from a following aircraft. The equations are based on a moving (but non-rolling) right-handed $x, y, z$ axis system centred at the centre of gravity of the directed aircraft, with rates of rotation ($\dot{\phi}$ $\dot{\theta}$ $\dot{\psi}$). The position of the centre of the trailing edge of the "lead aircraft" relative to these axes is ($s_x, s_y, s_z$).

Then $$\dot{s}_x = -u + s_y\dot{\psi} - s_z\dot{\theta}$$

$$\dot{s}_y = V_T(\psi_T - \psi) - V_c(\beta \cos \phi - \alpha \sin \phi) - s_x\dot{\psi}$$

$$\dot{s}_z = -V_T(\theta_T - \theta) - V_c(\alpha \cos \phi + \beta \sin \phi) - s_x\dot{\theta}$$

where $\phi$, $\theta$, $\psi$ are roll, pitch and yaw orientations of the directed aircraft.

$\alpha$ = incremental incidence of directed aircraft.
$\beta$ = incremental sideslip of directed aircraft.
$V$ = true airspeed.

Subscript C refers to directed aircraft.
Subscript T refers to "lead" aircraft.

$u = V_c - V_T$.
also $l$ = semi-span of target aircraft.
$m$ = length span of target aircraft.
$n = m \sin \alpha_T$ where $\alpha_T$ = target wing incidence.

FIGURE 3 shows a "lead" aircraft produced by five lines and a dot. The co-ordinates, as numbered on FIGURE 3, are as follows:

| Co-ordinate | X | Y |
|---|---|---|
| 1 | $\dfrac{-s_y}{s_x}$ | $\dfrac{-s_z}{s_x}$ |
| 2 | $\dfrac{-(l\cos\phi_T + s_y)}{s_x}$ | $\dfrac{(l\sin\phi_T - s_z)}{s_x}$ |
| 3 | $\dfrac{n\sin\phi_T - s_y - m(\Psi - \Psi_T)}{s_x + m}$ | $\dfrac{n\cos\phi_T - s_z - m(\theta - \theta_T)}{s_x + m}$ |
| 4 | $\dfrac{l\cos\phi_T + s_y}{s_x}$ | $\dfrac{-l\sin\phi_T + s_z}{s_x}$ |
| 5 | $\dfrac{f\sin\phi_T - s_y}{s_x}$ | $\dfrac{f\cos\phi_T - s_z}{s_x}$ |

In the formulae for point 5, $f$ is the height of the fin. It will be seen that these equations involve only addition, subtraction, multiplication, division, differentiation, integration, and generation of sine and cosine functions, all of which are standard analogue computer functions.

In practice, it is likely that considerable simplification to these control laws will be made for airborne application. For example, if $s_x$ is assumed constant, $V_c = V_T$ and the equations reduce to:

$$\frac{s_y}{s_x} = \frac{1}{s_x}[\int V_C(\Psi_T - \Psi - \beta\cos\phi + \alpha\sin\phi)] - \Psi$$

$$\frac{s_z}{s_x} = \frac{-1}{s_x}[\int V_C(\theta_T - \theta - \alpha\cos\theta - \beta\sin\theta)] - \theta$$

The need for division, multiplication and differentiation within the computer is thus removed. If signals proportional to $\alpha$ and $\beta$ are not available, these may also be omitted.

Further modification to the display control laws to allow certain signals to be phase advanced (display quickening) may be desirable, to ease the pilot's task under some circumstances.

FIGURE 4 is a block diagram of the display data computer for the simplified equations given above. The two resolvers are set to provide the sine and cosine of the angles $\phi$, $\phi_T$ and they multiply these sines and cosines by $\alpha$, $\beta$ as required by the equations given above. Within the computer the summing amplifiers permit the addition and subtraction of the input components as required and these are followed by integrating circuits to convert the rate values to position values.

The input $V_c$ is used to control the gain of the first summing amplifiers.

The co-ordinate points 2, 3 and 4 represent the ends of the lines forming the triangle and it is now required to generate ramp voltages which, when applied to the deflection circuits of the cathode ray tubes, will cause appropriate deflection of the electron beam which strikes the phosphor screen, the lines being generated one after another. The apparatus for achieving this is shown in FIGURE 5. The successive application of the deflection signals of different lines is effected by means of the ring-counter 33 which, in the case illustrated, has 16 outputs. This ring counter is operated by pulses derived from a crystal oscillator 30 the output of which passes through a squaring unit 31 and a flip-flop 32. Pulses derived from each of the 16 output conductors B1 to B16 of the counter 33 are applied in turn to transistor circuits by means of which simultaneous X and Y co-ordinate voltages are applied to the cathode ray tube. Only the circuits relating to the X co-ordinate voltages are shown in FIGURE 5, the circuits for the Y co-ordinate voltages being exactly the same. The apparatus to be described is capable of drawing 16 lines on the face of the cathode ray tube; the first of these lines will be defined by voltages $X_1$, $Y_1$ and $X_2$, $Y_2$ these voltages being modified as previously described as a consequence of any movement of the craft or simulated craft or any desired movement of the "lead aircraft." There are three transistors for each of the 16 pairs of X co-ordinate voltages, the three transistors TR1, TR2 and TR3 being used for the generation of the voltage B1 and the transistors TR46, TR47 and TR48 being used for the voltage B16. Under the control of voltages B1 to B16 applied to their bases, these transistors serve to switch the relevant X co-ordinate voltages to amplifiers A1, A2 and A4 which are common to all the 16 lines. The amplifier A1 receives voltages corresponding to the first ($X_1$) of the pair of X terms which, together with the corresponding pair of Y terms, define the first straight line to be drawn on the face of the cathode ray tube. The amplifier A2 receives a voltage corresponding to the second ($X_2$) of the pair of X terms, together with the output of amplifier A1, the arrangement being such that the output of the amplifier A2 represents the difference ($X_2 - X_1$). This output thus represents the total extension in the X direction of the line to be drawn on the cathode ray tube. The amplifier A3 is an integrating amplifier having a capacitor C connected between its input and output and bi-directional transistor 35 the purpose of which is to discharge the capacitor at the end of each operation. The output of the amplifier A3 is thus a voltage which increases steadily to an amplitude representing the difference ($X_2 - X_1$). This is applied to the amplifier A4 which again receives a voltage representing the first term X and therefore provides an output voltage which starts at a level $X_1$ and increases or decreases steadily to a level $X_2$. This voltage is applied to the X deflection coil of the cathode ray tube. The application of the voltages $X_1$, $X_2$ ... $X_{31}$ to the amplifiers is achieved by pulses from the counter 33. Considering the voltages $X_1$ and $X_2$, the corresponding transistors TR1, TR2, and TR3 are normally bottomed. When the output conductor B1 of the counter 33 applies an output potential to the bases of these three transistors they are cut off, allowing the voltages $X_1$ to be applied to amplifiers A1 and A4 and the voltage $X_2$ to be applied to amplifier A2.

At the end of each ramp period of the integrating amplifier A3 a pulse from the flip-flop is applied through the transformer 36 to the base of the switching transistor 35 which is rendered conducting and thereby discharges the capacitor G. In order to keep leakage currents small, it is desirable to limit the reverse base voltage of the switching transistors to as low a value as possible in the cut-off condition. This requirement is met by using a transformer-coupled switching signal as shown in FIGURE 5. A diode gate consisting of the two diodes 37 and 38 selects the more positive of its two inputs, which are connected to earth and integrator output and controls the D.C. level of the transformer secondary. This allows a small-amplitude switching waveform to be used yet ensures that the transistor is always cut off on positive pulses.

To understand the operation of this apparatus, consider the generation of a line between the voltage co-ordinates $X_1$, $Y_1$ and $X_2$, $Y_2$. If the integrator input is $X_2-X_1$) volts, then the ramp amplitude at the output of the amplifier is $$(X_2-X_1) \cdot \frac{T}{R_1C} \cdot \frac{R_4}{R_2} \text{ volts}$$

where $T=$integrating interval, in seconds.
$C=$integrating capacity, in farads.
$R_1$ $R_2$ $R_3$ $R_4=$resistance in ohms.

A change in co-ordinate $X_1$ of $\Delta X_1$ volts must leave the voltage at the end of the ramp unaffected.

The conditions for correct scaling are, therefore:

$$\Delta X_1 \cdot \frac{T}{R_1C} \cdot \frac{R_4}{R_2} = \Delta X_1 \cdot \frac{R_4}{R_3}$$

or $$R_1C = \frac{R_3}{R_2} \cdot T$$

An identical circuit produces the ramp for the Y deflection circuit. If the integrating periods are identical the required ramp will be drawn on the tube face.

The amplifier A3 should preferably have a bandwidth of about 250 kc./s. in order to avoid the appearance of disturbances at the start of a ramp voltage. In the example which is being described, the integration period is 1 millisecond, and the reset period has the same duration. If the system is capable of drawing sixteen independent lines, the line repetition rate is thus about 33 per second.

To avoid undue separation of points which should be superimposed at the ends of two lines which meet at a corner (the separation being due to aircraft movement between the times when these two lines are painted on the display screen), it is desirable that the lines should not be painted in quick succession and then repainted after a long interval but should be distributed evenly throughout the time cycle.

The pulses controlling the brightening of the trace when a line is to be drawn are provided by the flip-flop 32.

As all traces on the screen are painted in the same time cycle, long lines would be less bright than the short ones unless provision were made for applying a suitable driving voltage to the grid of the cathode ray tube. This driving voltage may be derived from a brilliance control computer which receives from the deflection control circuits of FIGURE 5, for the period of the line-drawing operation, a voltage roughly proportional to the length of the line. We have found in practice that a voltage representing the quantity $|X_n-X_m-1|+|Y_n-Y_n-1|$ is a sufficiently good approximation and two components of such a voltage may conveniently be derived from the outputs of the amplifiers A2 in the X and Y deflection control circuits.

Although the co-ordinate method of generating a display has been described, other electronic methods are equally possible. For example, the display could be based on a conventional television raster, with appropriate black-out pulses, and with suitable non-linearity, in the amplification of signals, and adjustment of gain.

The advantages of the form of display proposed will be seen from FIGURE 6. FIGURE 6 represents a sequence of displays in which the lead aircraft is defined by signals, either from the ground command station or pre-selected voltages within the aircraft, and performs a descending turn to starboard, and in which the pilot of the following aircraft maintains his station reasonably well. The windscreen frame 50 is of course a permanent feature. In diagram $a$ of FIGURE 6 the lead aircraft starts its starboard turn. In diagram $b$ the following aircraft has followed the lead aircraft into the starboard turn and the lead aircraft has lost some height. In the remaining diagrams $c$, $d$, $e$ and $f$ the lead aircraft completes its turn, copied by the following aircraft, the final diagram $f$ showing the situation in which the following aircraft is immediately behind the lead aircraft, at the same height, and travelling in the same direction.

If desired, the pilot may be provided with means for changing the magnification of the display, to vary the apparent distance ahead of the lead aircraft.

The apparatus may be used to maintain the aircraft in an accurate and stable fashion on a pre-determined flight path during a landing approach. In such a case, the lead aircraft will be caused to follow the desired flight path by the ground signals. In the display shown in FIGURE 7 there are three ground-plane lines, a horizon line and two broken lines (generated by the co-ordinate system previously described) which represent a standard width infinite runway the centre line of which would coincide with the centre line of the runway on which the landing is to be made. The gap in the line subtends an elevation angle of 3° at the pilot's eye at all times and is positioned so that its centre is 2½° in elevation below the horizon line (assuming a 3° glide slope).

The display also includes a range/height circle 60 which appears as a full circle on the tail of the lead aircraft when starting the final descent and unwinds as the touchdown point approaches. Finally, the display includes a digital height indication 61, an air speed error indicator 62 and a digital air speed indicator 63. The height and air speed signals are available from equipment carried wholly by the aircraft and standard techniques can be used to generate the numerals on the face of the display cathode ray tube. The circle on the tail of the lead aircraft is generated by a circuit in which an oscillator feeds deflection voltages to the X and Y deflection coils which are 90° out of phase to each other. The "unwinding" of the circle is obtained by a circuit including a gate the operation of which is locked to the oscillator and which is controlled as a function of range from the touchdown point, the gate permitting a brightening pulse to be applied to the cathode ray tube for a portion of the complete circle which depends upon this range.

The gaps in the runway lines are obtained by the application of black-out pulses to the brightening circuit during the generation of the runway lines.

I claim:

1. Apparatus for providing a visual display on a screen of a flying craft or simulated craft having flight controls to modify its speed, heading and attitude, comprising: a display control signal generator for providing on the screen a display representing the contour of an imaginary flying body seen in perspective from the craft, including a computer for modifying the said display-control signals and thereby the contour of the flying body; and means for applying to the computer, electric signals representing a required movement of the craft to produce a change in the display control signals to modify the contour of the flying body in the manner which would result from a corresponding movement of the flying body relative to the craft; and means for applying to the computer electric input signals corresponding to changes in the heading or attitude of the craft to modify the contour of the imaginary flying body accordingly, whereby when the required movement of the craft has been effected the said modification of the contour of the flying body will have been nullified.

2. Apparatus in accordance with claim 1 in which the electronic image generators include a deflection control circuit which is responsive to input data in the form of two pairs of co-ordinates and which controls the visual display means to provide on the latter a straight line or curve, the combination of straight lines or curves representing on the display screen the outline of the imaginary flying body.

3. Apparatus in accordance with claim 2, in which the imaginary flying body is represented by an image of triangular shape representing a delta-winged aircraft.

4. Apparatus in accordance with claim 3, including means in the display-control signal generator for providing on the display a mark at the centre of that line which represents the trailing edge of the delta-winged aircraft.

5. Apparatus in accordance with claim 1 including means in the display-control signal generator for providing on the display at least one ground plane line representing the horizon.

6. Apparatus in accordance with claim 5, including means in the display-control signal generator for providing on the display ground plane lines representing the lateral edges of a runway.

7. Apparatus in accordance with claim 1 including means for generating on the display a line representing by its length or arrangement the range of the flying body from a touchdown point.

8. Apparatus in accordance with claim 7, including means for generating on the display a circle or arc of a circle and means controlled by the range from the touchdown point for progressively blacking out as the range decreases.

9. Apparatus in accordance with claim 5, including a height scale superimposed on the display to permit the aircraft height to be ascertained by the position of the ground plane line representing the horizon in relation to the height scale markers.

References Cited

UNITED STATES PATENTS

| | | | |
|---|---|---|---|
| 2,930,143 | 3/1960 | Dehmel | 35—12 |
| 3,081,557 | 3/1963 | Mailhot | 35—12 |

FOREIGN PATENTS 873,321   7/1961   Great Britain.

EUGENE R. CAPOZIO, *Primary Examiner.*

R. W. WEIG, *Assistant Examiner.*